United States Patent [19]

Clark

[11] 4,080,300
[45] Mar. 21, 1978

[54] APPARATUS FOR DISTRIBUTING SOLIDS UNDER SLUG LOADING

[75] Inventor: Robert B. Clark, Overland Park, Kans.

[73] Assignee: Mid-West Conveyor Company, Inc., Kansas City, Kans.

[21] Appl. No.: 768,408

[22] Filed: Feb. 14, 1977

[51] Int. Cl.² ............................................. B01D 21/24
[52] U.S. Cl. ............................................. 210/527
[58] Field of Search ........... 210/523, 526, 527, 532 R, 210/168, 171; 198/629, 729

[56] References Cited

U.S. PATENT DOCUMENTS

| | | | |
|---|---|---|---|
| 1,110,453 | 9/1914 | Monosmith | 261/113 |
| 1,946,805 | 2/1934 | Mojonnier | 210/171 X |
| 2,319,561 | 5/1943 | Scharsch | 198/629 X |
| 2,865,509 | 12/1958 | Harlan | 210/526 X |
| 3,576,251 | 4/1971 | Clyne | 210/526 X |
| 3,795,316 | 3/1974 | Wood | 210/526 X |

*Primary Examiner*—William A. Cuchlinski, Jr.
*Attorney, Agent, or Firm*—Fishburn, Gold & Litman

[57] ABSTRACT

Apparatus for removing solids from a settling pit or tank is disclosed which comprises a horizontal collector section that rests at the bottom of the tank and an attached vertical conveyor or elevator section having an upper, discharge end above the tank. Carrier means is employed for conveying settled solids across the floor of the collector section and upwardly within the elevator section for discharge into a receiving container located outside the tank. The collector section includes a distributor means whereby settling solids are distributed over the floor thereof at a desired rate, thereby preventing overloading of the carrier means during peak or slug loading conditions so that removal of solids from the tank at a desired rate remains smooth and unhampered.

10 Claims, 4 Drawing Figures

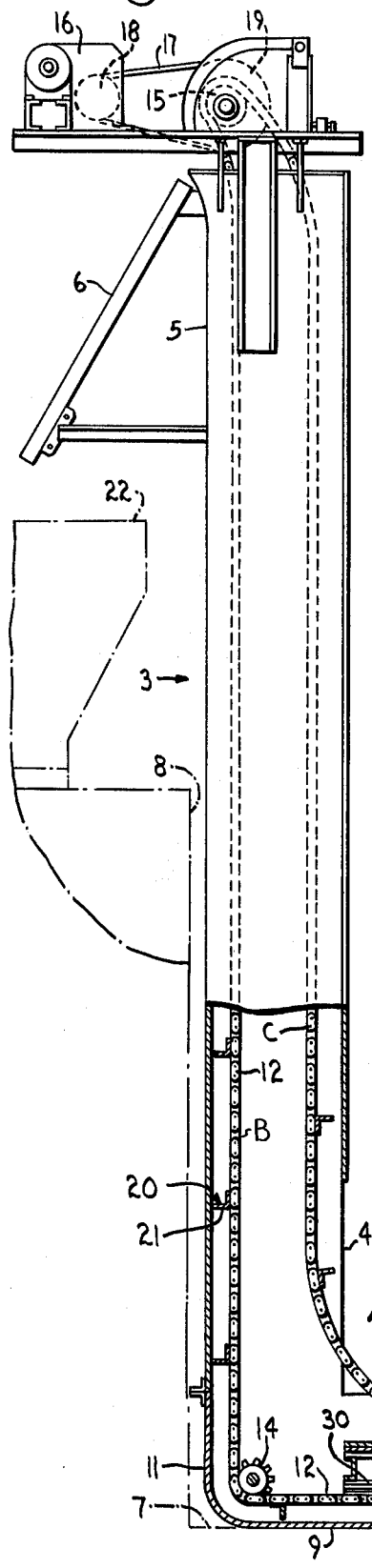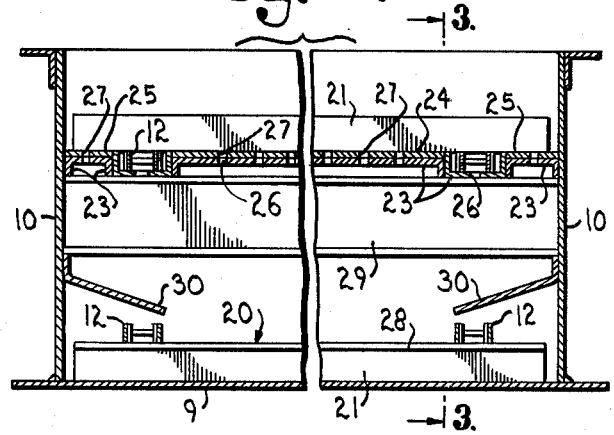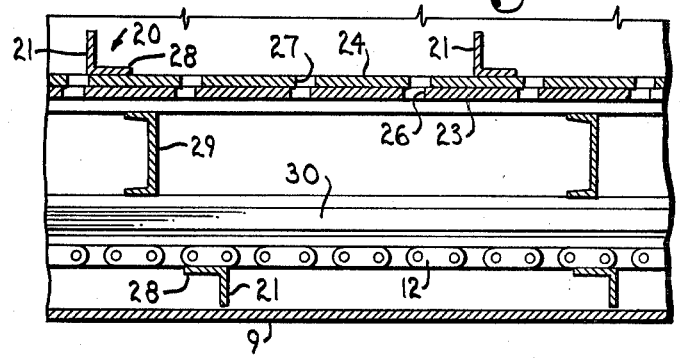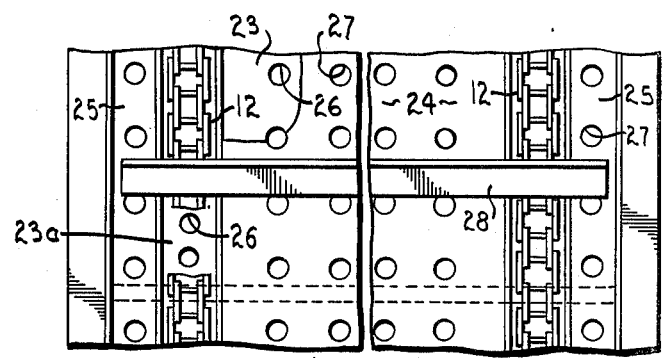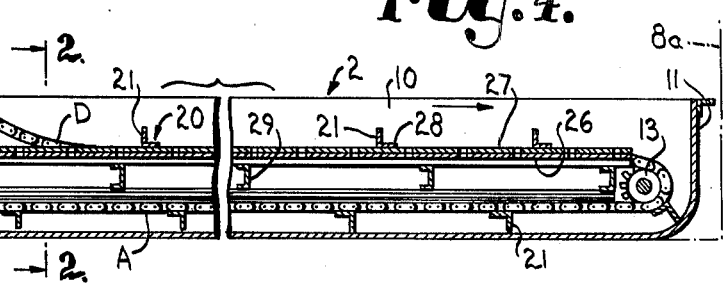

APPARATUS FOR DISTRIBUTING SOLIDS UNDER SLUG LOADING

BACKGROUND OF THE INVENTION

This invention pertains to apparatus for separating solids from liquids, and more particularly pertains to apparatus employed for retrieval of relatively dense solid products or wastes from process liquids such as water, oils or solvents after the solids have settled therefrom. Specific examples include the retrieval of metal cuttings or filings from cutting oils, retrieval of dusts, fly ash or cinders from water circulated through a wet scrubber, removal of slag from water following quenching operations, and separation of compressible wastes such as sludges, asphalts or silts from process water tanks or waste water sumps.

More specifically, the present invention is an improvement in solids retrieval apparatus of the type which comprises an elongated, horizontally extending collector section which rests on the floor of a settling tank, an elongated, vertically extending conveyor or elevator section that is attached to one end of the collector section and has an upper discharge end above the pit or tank, and carrier means for conveying settled solids across the floor of the collector section and upwardly within the elevator section to the discharge end for retrieval of the solids from the tank. One version of such apparatus is described in U.S. Pat. No. 3,576,251, and it can be learned therefrom that retrieval of solids by such devices can be awkward, costly and inefficient as a result of improper design or operation. It is contended, for instance, that flights on the carrier means must be set and maintained in a proper disposition if they are to be effective in moving accumulated solids horizontally and then vertically out of the settling tank. Beyond this teaching, it has now been determined that the rate at which solids settle to the floor of the collector section is a factor which must be controlled, especially during peak or slug loading conditions when solids are settling from the liquid medium at a rate that is higher than normal, if overloading of the carrier means is to be prevented and removal of solids from the tank at a smooth and uninterrupted rate is to remain unhampered.

It should be noted, for instance, that the device disclosed in U.S. Pat. No. 3,576,251 does not include provisions for controlling the rate at which settling solids are delivered to the carrier means for conveyal across the floor of the collector section and up the elevator section. More specifically, the apparatus disclosed in the aforementioned patent comprises a medial, horizontally extending plate which resides above the floor of the collector section and provides a sought frictional drag on the flights of the carrier, and even though the plate may be perforated, the width thereof is not as great as that of the floor, and open spaces thus exist between the lateral edges of the plate and the sidewalls of the collector. It has been observed that during slug or peak loading conditions the settling of solids to the floor of the collector system remains largely unimpeded as a result of these open side spaces, and that there is little or no regulation of the rate at which settling solids are delivered to the carrier for controlling the loading thereof, nor hence for maintaining retrieval of solids from the tank at a smooth and uninterrupted rate.

SUMMARY OF THE INVENTION

One object of this invention is, therefore, to provide an improved apparatus for retrieval of accumulated solids from settling pits or tanks.

Another object is to provide apparatus of the aforesaid type which includes provisions for controlling the rate at which settling solids are made available to the carrier means thereof for smooth, continuous retrieval of the solids.

Still another object is to provide apparatus of the aforesaid type having means for evenly distributing the load of settled solids handled by the carrier means during peak or slug loading conditions.

Other objects and advantages of the invention will become apparent from the following description, the drawings, and the appended claims.

In apparatus for retrieving solids from the bottom of a settling tank, the present invention is an improvement which comprises an elongated, horizontally extending collector section having a floor, an elongated vertically extending conveyor or elevator section having a lower end attached to the collector section and an upper end from which collected solids are discharged, carrier means for conveying settled solids across the floor of the collector section and upwardly within the elevator section for discharge therefrom, and distributor means in the collector section above the floor thereof for controlling the rate at which settling solids fall to the floor for conveying by the carrier means.

BRIEF DESCRIPTION OF THE DRAWINGS

FIG. 1 is a side elevational view, partially in section, of a solids retrieval apparatus constructed in accordance with the present invention.

FIG. 2 is an enlarged cross-sectional view of the apparatus of FIG. 1 taken along line 2—2 therein.

FIG. 3 is a fragmented, sectional side view of the apparatus of FIG. 3 taken along line 3—3 therein.

FIG. 4 is a fragmented, partially sectional downward view of the apparatus shown in FIGS. 2 and 3.

DESCRIPTION OF PREFERRED AND ALTERNATIVE EMBODIMENTS

In FIG. 1, the solids retrieval apparatus shown therein comprises a frame 1 which includes an elongated, horizontally extending base or collector section 2 and an elongated, vertically extending conveyor or elevator section 3 having a lower end 4 attached to the collector section and an upper end 5 from which collected solids are discharged onto an attached chute 6. The collector section 2 and the lower end 4 of the elevator section reside within a settling pit or tank having a bottom and vertical sidewalls represented by dotted lines 7, 8 and 8a, respectively. Accordingly, the collector section 2 rests on the floor 7 of the tank whereas elevator section 3 is positioned adjacent the tank sidewall 8, and the collector has an open top, a horizontal floor 9, horizontally spaced sidewalls 10 which are perpendicular to the floor, and end walls 11 so as to form a receptacle into which solids fall upon settling from a liquid introduced into the tank. The collector and elevator sections can have approximately the same width of the tank, or two or more narrower units can be placed side by side in order to collect and retrieve settling solids over the full length and width of the tank.

Referring further to FIG. 1, the apparatus comprises a carrier means for conveying the collected solids which comprises two endless chains 12 that extend over idler sprockets 13 and 14 and driven sprocket 15. Each chain is driven in a closed-loop path by rotation of sprocket 15 with a power unit 16 that operates in conjunction with a belt or chain 17 and pulleys or sprockets 18 and 19. The two chains are spaced apart laterally as shown in FIGS. 2 and 4 and have conveyor flights 20 mounted thereon at spaced intervals along their length. As shown in the drawings, the conveyor flights are disposed transversally with respect to the collector section 2, and have a web 21 which extends vertically with respect to the length axis of the chains. In FIG. 1, each chain can be visualized as having a horizontally moving conveying section A, an upwardly moving conveying section B, a downwardly moving returning section C, and a horizontally moving returning section D. Accordingly, the flights on the conveying sections of the chains are referred to as conveying flights, whereas flights on the returning sections are referred to as returning flights. In operation, conveying flights scrape settled solids off the floor 9 of the collector section 2, and thence convey the solids to the elevator section 3 and upwardly therein for subsequent discharge onto chute 6. Thereafter, the retrieved solids are deposited in a collection bin 22 or other disposal receiver and are subsequently removed from the collection site.

As was previously indicated, the apparatus combination of the present invention comprises a distributor means located above the floor of the collector section for controlling the rate at which settling solids fall to the floor for retrieving conveyal by the carrier means. As shown in the drawings, the distributor means comprises a lower perforated plate 23 which extends all the way across the width of the collector section 2 and is stationarily attached to the sidewalls 10 thereof, and also a medial upper perforated plate 24 and lateral upper perforated plates 25 which rest on the lower plate. The lower plate 23 is provided with a plurality of holes 26 in a predetermined restrictive pattern, whereas the upper plates are provided with holes 27 of a suitably corresponding pattern so that by sliding the upper plates longitudinally the holes thereof can be aligned with those of the lower plate to maximize open area between the upper and lower sides of the plates, or holes of the upper and lower plates can be disaligned to a greater or lesser degree to adjust the open area downward to a smaller value. Accordingly, the size of the openings formed by the confronted plates can be altered in the field until an optimum size is found for delivery of the solids to the conveying flights at a desired rate. The purpose and manner of such adjustment will be discussed in greater detail hereinafter.

It should also be noted that the lower perforated plate 23 is provided with chain recesses 23a therein which forms a track for guidance and support of sections D of the chains 12, and these recesses also permit a horizontally extending web 28 of the returning conveyor flights to slide or pass over the upper surface of plate 23 in closely spaced relation or flush abutment therewith, as desired. The lower plate 23 is firmly supported from below by means of cross-bracing sections of channel irons 29, which also serve to brace the sidewalls 10 of the collector section. Additionally, chain guards 30 can be located below the distributor plate 23 and above the lower chain portions D so that they project inwardly and overlie these portions to reduce their exposure to settling solids as would otherwise fall directly onto them.

Although use of two confrontingly aligned, horizontally coincident perforated plates has been described as a distributor means whereby the open area of the distributor is selectively variable by alignment or disalignment of their respective perforations, it will be understood that only one distributor member, i.e., lower plate 23 or an equivalent thereto, may be employed as the desired open area of the distributor is sometimes a known factor prior to the fabrication and use thereof, or can be suitably altered in the field. An important feature, therefore, is use of a distributor means which permits control of the rate at which settling solids fall to the floor of the collector for conveying by the carrier flights, e.g., use of a perforated plate, such as plate 23, which extends all the way across the width of the collector section and is suitably perforated to effect even distribution of settled solids over most of the surface area of the floor.

As was previously indicated, the chains 12 are arranged to be driven in an endless loop pattern whereby the upper horizontal sections D thereof reside within the recesses 23a of plate 23 so that the horizontally extending web 28 of the flights can slide or pass over the upper surface of the plate in flush abutment or closely spaced therefrom. Arranged accordingly, the returning flights on chain sections D function in combination with the perforated plate 23 to effect delivery of solids to the floor 9 of the collector section for transport to the discharge end 5 of the elevator section by means of the conveying flights on chain sections A and B.

More specifically, the returning flights on the chain sections D pass or slide along the upper surface of the upper plates 24–25 and thereby convey solids gathering thereon into the perforations in the plates, thereby causing the solids to sift through the perforations in an even pattern of distribution, e.g., as from a sieve, just prior to falling to the floor 9 for collection and transportation by the conveying flights. During peak or slug loading conditions, the settling solids are thus partially impeded from settling directly to the floor 9 of the collector, and the rate of passage of the solids through the perforations in the plate is determined by the size and number of the perforations and the speed at which the chains are driven. These parameters can be optimized by means of a few simple experiments to establish a desired rate of delivery of solids to the conveying flights on sections A of the chain whereby a desired solids conveyal rate is established without risk of overloading the conveying flights, or without experiencing erratic delivery of solids thereto as would result in non-uniform loading and a resulting irregular delivery of retrieved solids into the collection bin 22.

Use of one or more upper perforated plates in conjunction with a lower perforated plate, as previously described, provides the advantage of allowing initial drilling of the perforations to a size which is large enough to permit the greatest anticipated delivery of the solids to the conveyor flights, but which are easily reducible in size in the field to provide a smaller open area should such be needed. Accordingly, the upper plates can be suitably affixed, as by tack welding, to the lower plate for transporation and installation of the collector section, and the fixing joints can be broken when adjustment of the hole size is needed, followed by rewelding of the plates to again unite them after the adjustment has been made. As may occur to those skilled in this art in light of the above, if ease of hole size adjustment during operation is desired, suitable manual or powered actuators (not shown) may be used to shift the plates with respect to each other, as desired.

A solids retrieval apparatus which fulfills the previously stated objects has now been disclosed in detail, and it will be understood that even though the present invention has been described with reference to specific embodiments thereof, other embodiments will become apparent which are within the spirit and scope of the following claims.

What is claimed and desired to secure by Letters Patent is:

1. Apparatus for removing solids from a settling tank, said apparatus comprising:
   (a) a frame having a vertical section and a base section which extends laterally therefrom, said base section having an open top, a floor, sidewalls, and a perforated distributor plate means located between the floor and top of said base section and extending horizontally widthwise from one of said sidewalls to the other and also horizontally lengthwise over a subatantial portion of said floor for controlling the rate at which solids, upon introduction to the tank, fall to the floor after settling within said tank,
   (b) a driven endless carrier means which extends in a closed loop on the vertical and base section of the frame, and
   (c) a plurality of elongated flights mounted on said carrier means at spaced intervals along its length, said flights being aligned transversally with respect to said base section, and wherein some of the flights are positioned to pass along an upper surface of said perforated distributor plate while other flights pass along the floor of the base section when said carrier means is being driven.

2. Apparatus as in claim 1 wherein said driven carrier means comprises a pair of chains which are laterally spaced apart from each other, each chain having an upper horizontal portion above said distributor plate and a lower horizontal portion below the plate, said upper and lower portions extending lengthwise in said base section, and wherein said plate has chain recesses which extend lengthwise therein for accommodation of the upper horizontal portions of the chains.

3. Apparatus as in claim 2 wherein said lower horizontal portions of the chains extend lengthwise in said base portion between said distributor and floor, and further comprising inwardly sloping chain covers located below said distributor and above said lower chain portions, said covers projecting transversely inward and overlying the lower chain portions.

4. Apparatus as in claim 1 and further comprising a perforated plate in horizontally coincident relationship with said distributor, said perforated plate having perforations therein which are at least partially aligned with perforations in said distributor plate.

5. Apparatus as in claim 4 wherein at least one of said distributor plates and said perforated plates is stationarily attached to said frame.

6. Apparatus for removing solids from a settling tank, said apparatus comprising:
   (a) an elongated, horizontally extending collector section having a floor,
   (b) an elongated, vertically extending elevator section having a lower end attached to the collector section and an upper end from which collected solids are discharged,
   (c) carrier means for conveying settled solids across the floor of the collector section and upwardly within the elevator section for discharge of the solids therefrom, and
   (d) distributor means in said collector section above the floor thereof and having sized openings for controlling the rate at which settling solids fall to said floor for conveying by said carrier means, said distributor means blocking settling solids against flow to said floor except where said sized openings are provided.

7. Apparatus as in claim 6 wherein said distributor means is a member having perforations therethrough which member extends lengthwise and widthwise in said collector section.

8. Apparatus as in claim 7 wherein said carrier means comprises conveying flights which extend transversally and are spaced apart longitudinally with respect to said collector section, and wherein some of said flights are drawn over said distributor means for urging settled solids into said perforations therein while other flights are drawn over said floor for urging solids therefrom which have fallen through said perforations, and while still other of said flights convey solids that have been urged from said floor through said elevator section to the upper discharge end thereof.

9. Apparatus as in claim 7 and further comprising means in combination with said perforated member for selectively increasing or decreasing the size of the perforations therein.

10. Apparatus as in claim 9 wherein said means for selectively increasing or decreasing the size of the perforations in said perforated member is a second perforated member that is horizontally coincident with the first aforesaid perforated member and which is selectively securable and releasable with respect to horizontal movement for orientation of perforations in one of said members with perforations in the other.

* * * * *